United States Patent Office 3,400,339

Patented Sept. 3, 1968

3,400,339

COMBINING OF RADIO FREQUENCY SIGNALS

Arthur Brian Shone, Finchampstead, England, assignor to The Marconi Company Limited and Standard Telephones & Cables Limited, both of London, England Filed Aug. 2, 1965, Ser. No. 476,342
Claims priority, application Great Britain, Aug. 7, 1964, 32,288/64
5 Claims. (Cl. 333—9)

ABSTRACT OF THE DISCLOSURE

A commutating ring combining unit for feeding an aerial from two television transmitters has four terminals connected in a ring by transmission lines of lengths X°,$X°-90°$, X° and $X°+90°$ respectively where $X°=m\times 90°$ and $n\times 90°$ at the two transmitter mid-band frequencies respectively and $m$ and $n$ are even and odd integers respectively.

Figure 1:
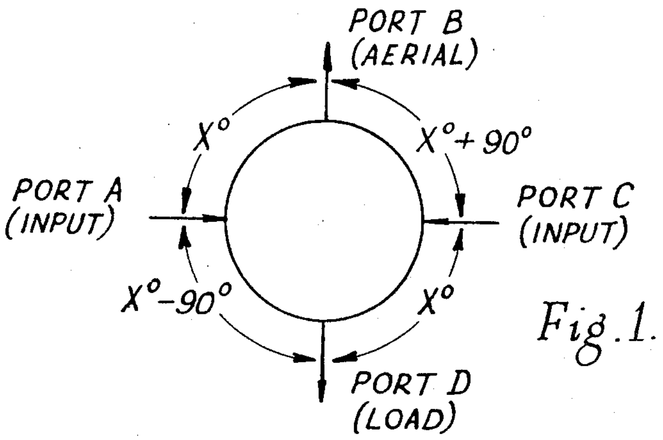

The present invention relates to the combining of radio frequency signals of different frequency bands and particularly a plurality of wide-band signals such as the combined sound and vision channels of a television transmission.

In the past a number of different types of combining networks have been employed to combine the sound and vision channels of a television picture into a single transmission line feeding a common aerial. All these networks employ resonators of various types adjusted to cater for the sharp transition from pass to stop characteristics which occurs in the narrow band between the edge of the vision channel and the commencement of the sound channel. In the 41–68 mHz. band, the 86.5–100 mHz. band and the 161–230 mHz. band, each combined sound and vision television channel of this type has, in the past, been fed into its own individual aerial. In 470–960 mHz. band it is often technically impossible, or uneconomic, to provide a separate aerial for each television channel and a requirement therefore arises for a new type of combining unit. In this case there will be two or more wide-band channels to be combined into a common transmission line but the frequency spacing between the bands will, in general, be very much greater than is the case in vision/sound combining units; in practice it is likely to be the equivalent of two or three times the bandwidth of the individual channels. For combining channels of this type by means of the existing types of combining network the requirements for the resonators are very much less stringent than is normally the case and the possibility of dispensing with resonators completely becomes attractive. This is particularly the case in 470–960 mHz. band where it may be necessary to combine up to four high power vision and four high power sound transmissions, with the risk of the peak volts being additive, and where the physical dimensions of resonators and feeders are limited due to the short wavelength of the signals being combined. There is therefore a requirement for a new type of combining unit to deal with this special problem and the present invention has for its principal object to provide such a unit.

According to the present invention there is provided a unit for combining two radio frequency signals of different frequency bands applied at two input terminals A and C respectively and for feeding the combined signals to a common output terminal B, the unit comprising substantially non-resonant transmission lines interconnecting the said three terminals and a fourth terminal D connected to a dissipative load, the lengths of the transmission lines and their arrangement being such that the greater part of the radio frequency energy applied at terminals A and C is transferred to the terminal B. The transmission lines may be arranged in a ring and may have electrical lengths such that at the mid-band frequencies of the two input signals the signals at terminal B, arriving from opposite directions around the ring, due to input signals at A and C respectively are substantially in phase while the signals arriving, from opposite directions around the ring, at the terminals C and D due to an input signal at A and the signals arriving, from opposite directions around the ring, at terminals A and D due to an input signal at C are substantially in antiphase.

Figure 2:
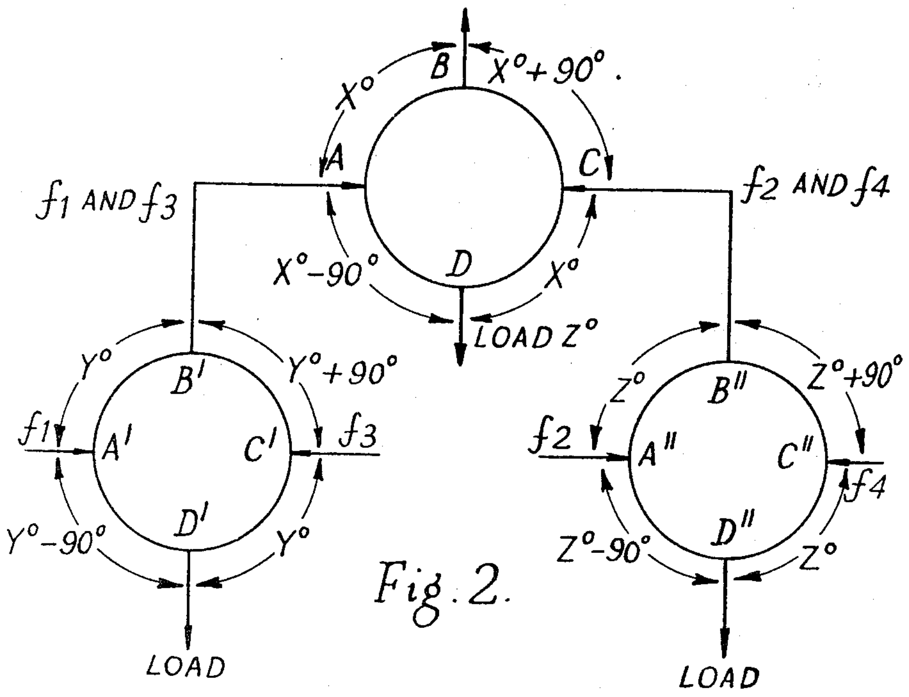

The invention will be described, by way of example, with reference to the accompanying drawing in which:

FIG. 1 is a diagram of a simple embodiment of the present invention for combining two input signals, and FIG. 2 is a diagram of an embodiment of the invention for combining four input signals.

Referring to FIG. 1, four ports A, B, C and D are connected together by lengths of transmission line, for instance coaxial cables. The ports A and C are input ports for two signals of different mid-band frequencies, port B is the output port which may be coupled to an aerial and port D is connected to a dissipative load. The two inputs at A and C, in this example, are arranged to have substantially the same amplitude, although this is not necessary.

If the electrical lengths of the transmission lines are such that the phase shift at the mid-band frequency between A and B and C and D is X°, the phase shift between C and B is $X°+90°$ and that between A and D is $X°-90°$, then the phase of aninput signal applied at A reaching B in a clockwise direction will be shifted X° and that reaching B in an anti-clockwise direction will be shifted $X°-90°+X°+X°+90°=3X°$ so that the phase difference between the two paths is 2X°. If, therefore, 2X° be made an even multiple of half a wavelength the two signals reaching B from A will be in phase. Similarly in this condition it will be seen that the signals from A reaching C and D along the two paths will be in antiphase. Similar considerations apply to signals from C: if 2X° be made an odd number of half wavelengths at the mid-band frequency of the input at C, at B they will be in phase and at A and D they will be in antiphase.

It is, therefore, arranged that the electrical lengths of the lines are such that X approximates as closely as possible to $m\times 90°$ at the mid-band frequency of the input at A and to $n\times 90°$ at the mid-band frequency of the input at C, where $m$ is an even integer and $n$ is an odd integer.

In general a slight loss of power to load at port D is less serious than a transfer of power between the input terminals (ports A and C) and the ring is preferably so arranged that the currents arriving at port C due to a generator at port A, and vice versa, are substantially in antiphase.

A further requirement of the combining unit is that the impedance seen at each of the input ports when the load and output ports D and B are correctly terminated shall be uniform over the band of the channel, or channels, entering at that port, and if possible over the stop-band also, in order that the generators connected to the input ports may see a correct termination. This condition is satisfied if the impedances connected to the load and output ports are equal and are half the value of the characteristic impedance of the ring.

Referring now to FIG. 2 there is shown an arrangement for combining at an output port B, which may be connected to an aerial, four signals of mid-band frequencies $f_1$, $f_2$, $f_3$ and $f_4$, these being in ascending or descending order of magnitude. The upper ring is as in FIG. 1. The input to port A consists of signals at $f_1$ and $f_3$ combined in a second ring and the input to port C consists of signals at $f_2$ and $f_4$ combined in a third ring. The second and third rings are constructed in the same way as the first ring, the ports having the same references with single and double dash superscripts. The phase angle X° of the first ring is represented in the other two rings by phase angles of Y° and Z°. Clearly more than four signals can be combined by a suitable extension of the arrangement of FIG. 2. It should be noted that when more than two channels are combined in any ring the mid-frequency of the channels entering at the two input ports should be approximately odd and even multiples of a common denominator, though small deviations from this rule can be accommodated by the compromise described in the example given below.

The following features of the combining units described may be noted:

(a) Due to the absence of resonators, no voltages can occur in the network in excess of the sum of the input line voltages. This property assumes considerable importance when dealing with a combination of several high power transmissions where the peak voltages are additive.

(b) The network is robust and cannot go off tune (apart from changes in ring length due to heating which, in practice, can usually be ignored).

(c) The cross insertion loss between the two input ports A and C is fixed only by the physical length and characteristic impedance of the ring and the impedance of the loads on the output ports B and D and these are, by their nature, highly stable. It follows from this that nothing attached to one input port can affect the transmission properties of the other input port to the two output ports (load and aerial). This property assumes particular importance in a combining unit which is used to connect the transmissions from two independent authorities into a common aerial.

(d) When more than two transmissions are combined the frequencies of the transmissions arriving at the output port from one input port are interleaved with those of the transmissions arriving from the other input port. This property is an advantage if, as in the United Kingdom, the channels allocated to different transmission authorities are staggered.

(e) Any intermodulation terms generated at the input sources due to inadequate cross insertion loss between the inputs have a mid-band frequency such that the interconnecting lines automatically direct the intermodulation terms to the absorber load and not to the common output.

(f) The inherent simplicity of the device reduces very materially the cost of this network in relation to all other known types of television combining network.

In many applications the combining unit is required to combine four transmission channels whose mid-band frequencies are spaced a mixture of 3 and 4 channel widths apart or similar slightly unequal spacings. A reduction of pass losses can often be obtained by adjusting the lengths of the transmission lines to give minimum power transference to the load at the mid-band frequencies of the channels as in the examples given below. This reduction is obtained at the expense of deteriorating either, or both, the impedance seen at the input ports or the cross insertion loss between the input ports and also between the output port and the load ports. In general it is important not to deteriorate the cross insertion loss between the input ports but some deterioration of input impedance is usually acceptable and the cross insertion loss between the output and load ports is not usually of importance.

One example of the design of the first ring (the upper) in FIG 2 in order to combine signals from channels 40, 43, 46 and 50 is as follows:

The frequencies are:

| Channel | Frequency band | Mid-band frequency |
|---|---|---|
| 40 | 622–630 | $626=f_1$ |
| 43 | 646–654 | $650=f_2$ |
| 46 | 670–678 | $674=f_3$ |
| 50 | 702–710 | $706=f_4$ |

Channels 40 and 46 are applied at A and channels 43 and 50 are applied at C. It will be assumed that the phase shifts between A and B and C and D are X° as shown and that the phase shift between B and C is changed from $X°+90°$ to a slightly different value L° and that between A and D is changed from $X°-90°$ to $L°-180°$. If X° is made 24×90° at 650 mc./s. and 26×90° at 705 mc./s. (i.e. a line one quarter wavelength long at 27.1 mc./s.=2.77 metres) it will be 23×90° at 623 mc./s. and 25×90° at 677 mc./s. Similarly if L° is made 24×90° at 624 mc./s. and 26×90° at 676 mc./s. (i.e. a line one quarter wavelength long at 26 mc./s.=2.882 metres) it will be 25×90° at 650 mc./s. and 27×90° at 702 mc./s. The line between A and D will then have a length 2.882–0.225 metres. With the above line lengths the pass losses have been minimised at the mid-band frequencies of the four channels at the expense of a slight disturbance of the quadrature relationships (i.e. at the expense of a slight degradation of the input impedances). The cross insertion loss between the diagonally opposite ports remains substantially unchanged.

In one embodiment the transmission lines consisted of outer conductors formed of 4-inch diameter standard copper water pipe with a ¾-inch outside diameter hard copper inner conductor for the straight portions and a ¾-inch outside diameter soft copper inner conductor for the four elbows connecting the straight portions.

I claim:

1. A unit for combining two radio freqency signals occupying different frequency bands having respective mid-band frequencies, comprising two input terminals (A) and (C) for the said two signals respectively, an output terminal (B) and a dummy load terminal (D), and a ring of four transmission lines connected between the terminals so that the terminals follow the order A, B, C, D, A round the ring, the transmission lines between A and B and between C and D both having electrical lengths substantially equal to X° and the transmission lines between B and C and between D and A having electrical lengths substantially equal to $X°+90°$ and $X°-90°$ respectively where $X°=m×90°$ at one of the mid-band frequencies and $X°=n×90°$ at the other of the mid-band frequencies and $m$ and $n$ are even and odd integers respectively.

2. A unit according to claim 1, wherein the transmission lines have a uniform characteristic impedance.

3. A unit according to claim 1, wherein the characteristic impdance of the transmission lines is substantially half the dummy load impedance and the output impedance.

4. A unit according to claim 1, wherein the impedance seen at the input terminals A and C is substantially uniform over the said frequency bands.

5. A unit according to claim 1, for combining more than two radio frequency signals occupying different bands, characterized in that the bands arriving at the output terminal B from one input terminal A are interleaved with the bands arriving at the output terminal B from the other input terminal C.

References Cited

UNITED STATES PATENTS 3,101,456 8/1963 Brown et al. ........ 333—1.1
3,189,848 6/1965 Miyagi ............ 333—1.1

HERMAN KARL SAALBACH, *Primary Examiner.*
PAUL GENSLER, *Assistant Examiner.*